US 8,496,435 B2

(12) United States Patent
Nannoni et al.

(10) Patent No.: US 8,496,435 B2
(45) Date of Patent: Jul. 30, 2013

(54) HELICOPTER ROTOR

(75) Inventors: Fabio Nannoni, Novara (IT); Dante Ballerio, Caronno Varesino (IT); Pierre Abdel Nour, Vergiate (IT); Attilio Colombo, Vergiate (IT)

(73) Assignee: Agusta S.p.A., Samarate (IT)

( * ) Notice: Subject to any disclaimer, the term of this patent is extended or adjusted under 35 U.S.C. 154(b) by 676 days.

(21) Appl. No.: 12/710,756

(22) Filed: Feb. 23, 2010

(65) Prior Publication Data

US 2010/0215496 A1 Aug. 26, 2010

(30) Foreign Application Priority Data

Feb. 25, 2009 (EP) .................................... 09425077

(51) Int. Cl.
*B64C 27/39* (2006.01)
(52) U.S. Cl.
USPC .................. 416/140; 416/141; 416/134 A
(58) Field of Classification Search
USPC ............ 416/26, 168 R, 140, 25, 33, 53, 103, 416/104, 105, 106, 108, 130, 134 A, 141, 416/135, 136, 107, 127
See application file for complete search history.

(56) References Cited

U.S. PATENT DOCUMENTS

| | | | | |
|---|---|---|---|---|
| 2,494,985 A | * | 1/1950 | Campbell | 416/106 |
| 2,640,553 A | * | 6/1953 | Hafner | 416/106 |
| 3,302,726 A | * | 2/1967 | Stanley | 416/106 |
| 3,361,216 A | * | 1/1968 | Walker | 416/26 |
| 4,915,585 A | * | 4/1990 | Guimbal | 416/140 |
| 5,141,398 A | * | 8/1992 | Bietenhader et al. | 416/107 |
| 2002/0136636 A1 | * | 9/2002 | Sehgal et al. | 416/104 |
| 2009/0110555 A1 | * | 4/2009 | Jones | 416/140 |

FOREIGN PATENT DOCUMENTS

| | | |
|---|---|---|
| EP | 0615904 | 9/1994 |
| WO | WO2005/075850 | 8/2005 |

OTHER PUBLICATIONS

Search Report in European Application No. 09425077 dated Jul. 31, 2009.

* cited by examiner

*Primary Examiner* — Nathaniel Wiehe
*Assistant Examiner* — Aaron Jagoda
(74) *Attorney, Agent, or Firm* — McCracken & Frank LLC

(57) ABSTRACT

A rotor for a helicopter, having a drive shaft rotating about a first axis; a hub angularly integral with the drive shaft about the first axis; and at least two blades projecting from the hub on opposite sides of the first axis and elongated along respective second axes crosswise to the first axis; each blade is movable with respect to the hub and to the other blade about a respective third axis crosswise to the respective second axis; the rotor has at least two dampers for damping oscillation of respective blades about the respective third axes, and which have respective first portions movable integrally with the respective blades about the respective third axes; and the dampers have respective second portions connected elastically to the respective first portions and functionally to each other.

10 Claims, 6 Drawing Sheets

HELICOPTER ROTOR

The present invention relates to a helicopter rotor.

BACKGROUND OF THE INVENTION

Helicopters are known comprising a fuselage; a main rotor fitted to the top of a central portion of the fuselage; and an antitorque tail rotor for counteracting the torque transmitted by the main rotor to the fuselage.

Articulated main rotors and/or antitorque rotors are also known.

Articulated rotors comprise a drive shaft that rotates about a first axis; a hub that rotates integrally with the drive shaft about the first axis; and a number of blades projecting from the hub along respective second axes radial with respect to the first axis.

Each blade can rotate with respect to the hub about the respective second axis to adjust its angle of attack with the airstream, and is free to oscillate about the hub about a respective third axis to perform a so-called flapping movement. More specifically, each third axis is crosswise to the first axis and to the second axis of the relative blade.

Each blade is free to oscillate with respect to the hub and the other blades about a respective fourth axis, parallel to the first axis, to perform a so-called "lead-lag movement".

A need is felt to damp vibration induced by lead-lag motion of the blades, using damping devices whose damping action is affected as little as possible by centrifugal force, so they are effective over a wide range of blade rotation speeds about the first axis, and a wide range of damping device positions along the second axes of the relative blades.

A need is also felt within the industry to damp vibration induced by lead-lag motion of the blades, using damping devices as lightweight and compact as possible.

Finally, a need is felt to damp vibration induced by lead-lag motion of the blades, using damping devices that require no operating fluid, e.g. oil, to function correctly, so as to simplify damping device construction and maintenance.

SUMMARY OF THE INVENTION

It is an object of the present invention to provide a helicopter rotor designed to meet at least one of the above requirements cheaply and easily.

According to the present invention, there is provided a helicopter rotor as claimed in the attached claims.

BRIEF DESCRIPTION OF THE DRAWINGS

Two preferred, non-limiting embodiments of the present invention will be described by way of example with reference to the accompanying drawings, in which.

DETAILED DESCRIPTION OF THE INVENTION

Figure 1:
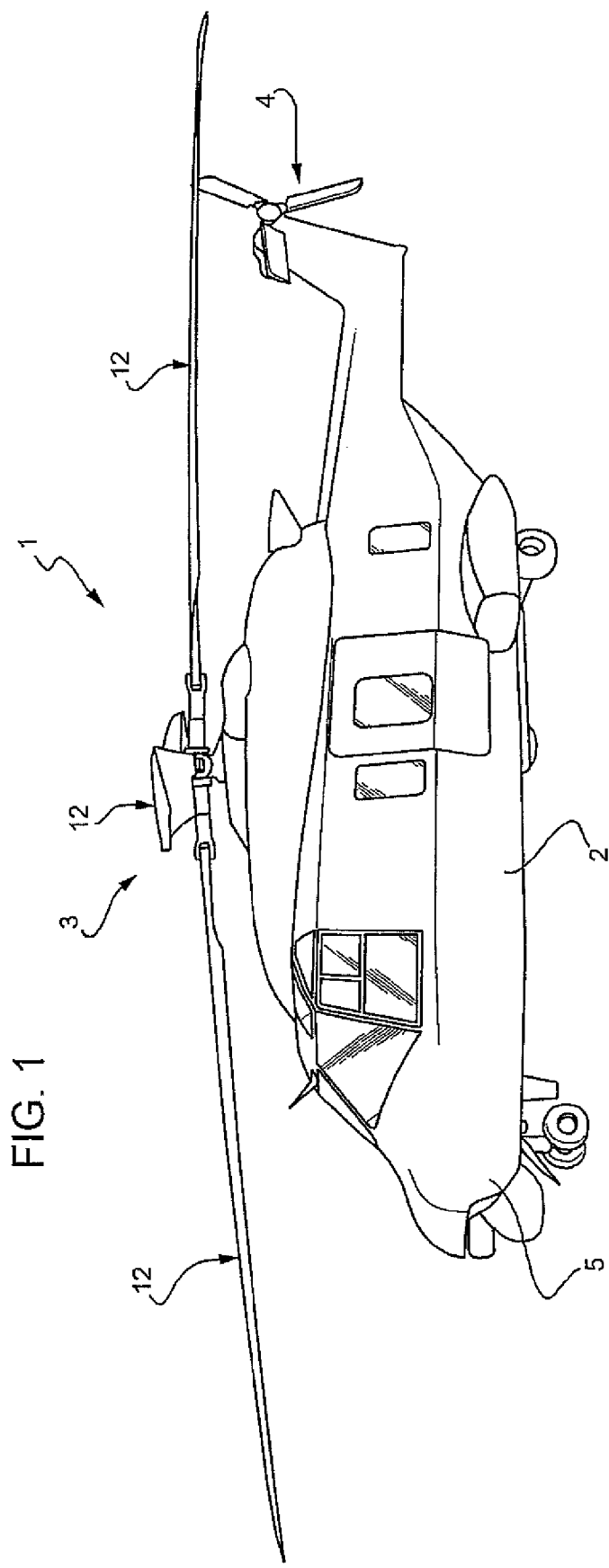
FIG. 1 shows a view in perspective of a helicopter comprising a rotor in accordance with the invention.

Number 1 in FIG. 1 indicates a helicopter substantially comprising a fuselage 2 with a nose 5; a main rotor 3 on top of fuselage 2; and an antitorque tail rotor 4 fitted to a fin projecting from fuselage 2 at the opposite end to nose 5.

More specifically, main rotor 3 provides helicopter 1 with the lift and thrust required to lift and propel helicopter 1 respectively, while rotor 4 exerts force on the fin to generate a torque reaction on fuselage 2 to balance the torque exerted on fuselage 2 by main rotor 3, and which would otherwise rotate fuselage 2 about an axis A.

Figure 2:
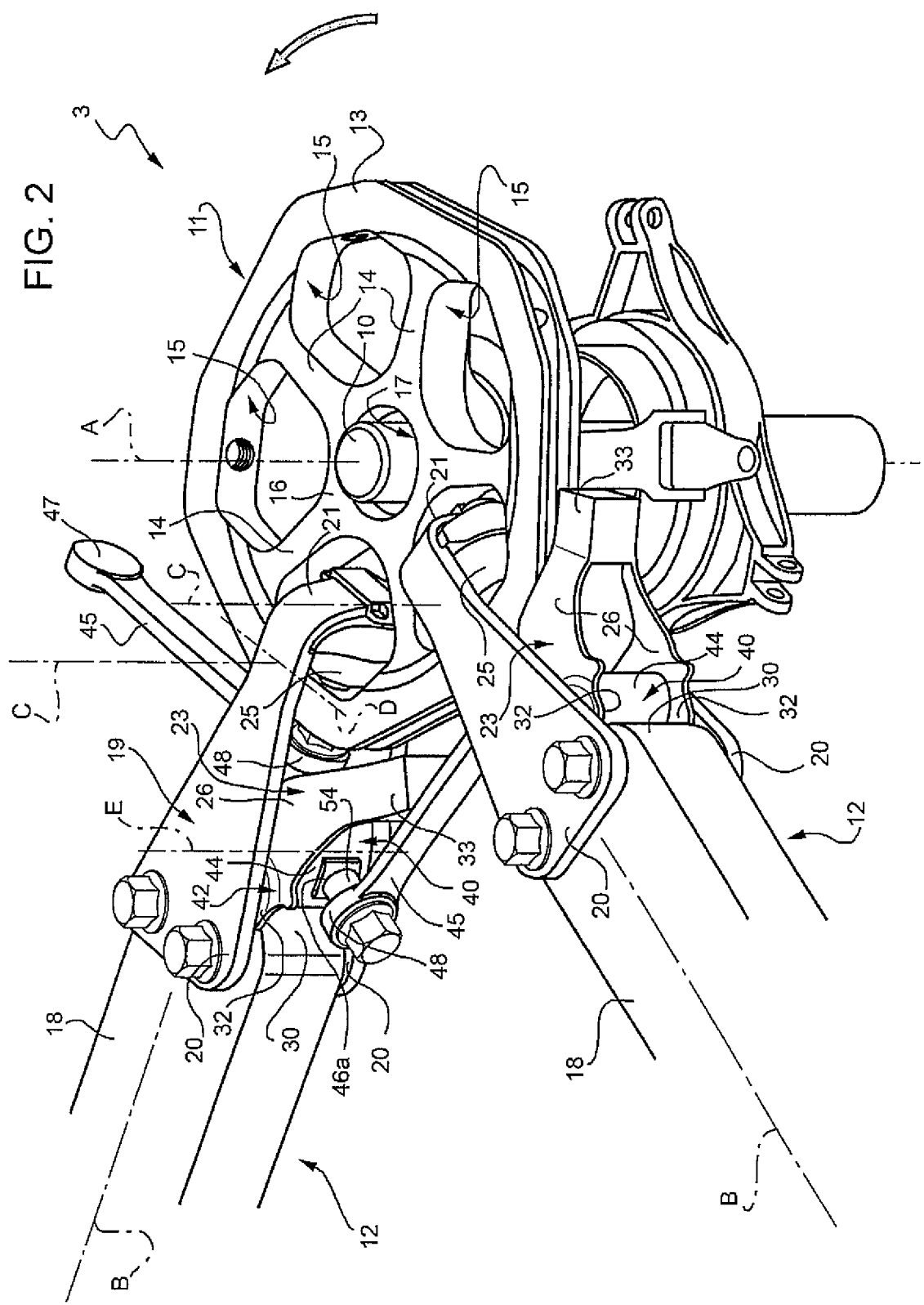
FIG. 2 shows a view in perspective, with parts removed for clarity, of a first embodiment of the rotor according to the invention.
Figure 3:
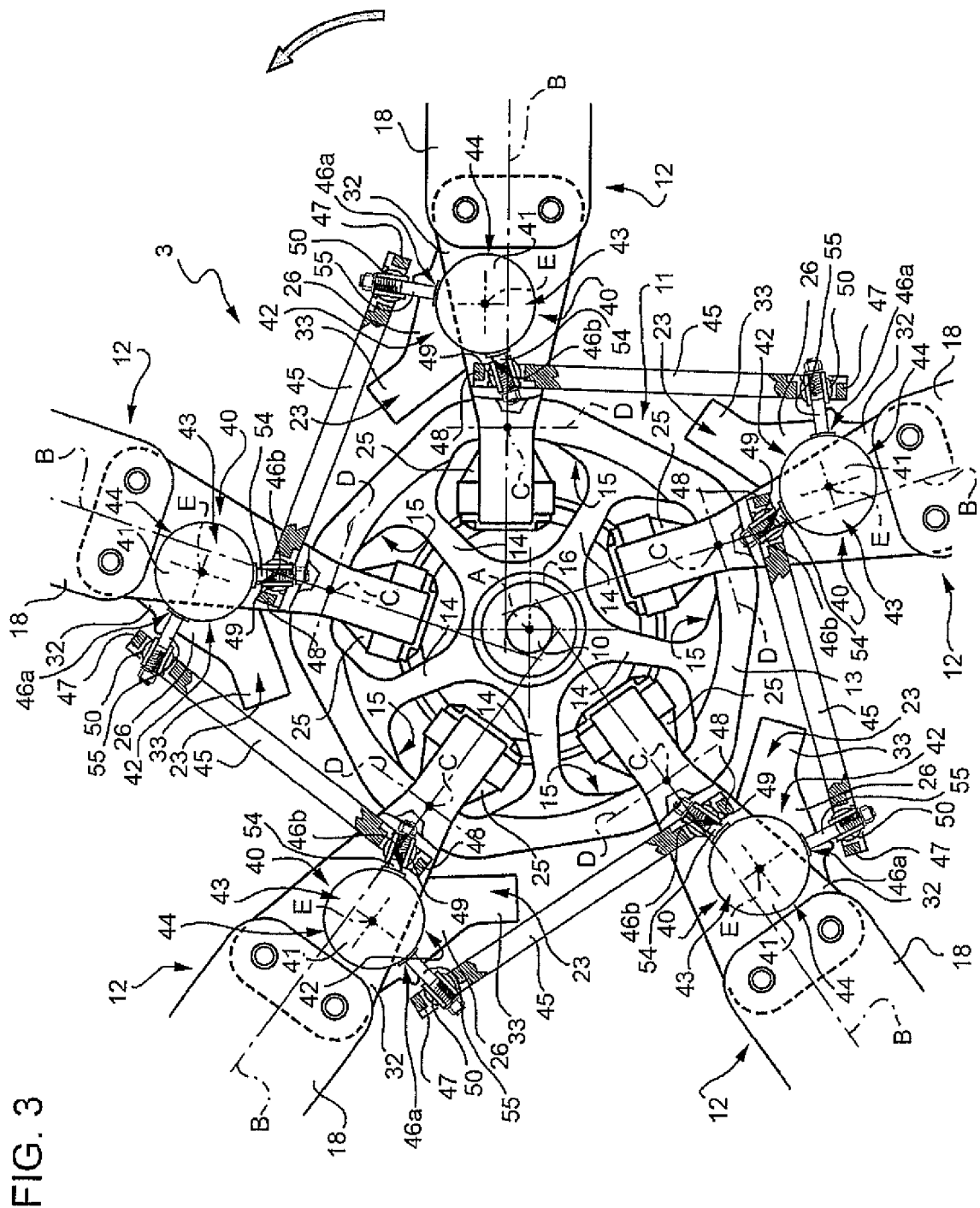
FIG. 3 shows a top plan view of the first embodiment of the rotor.

Rotor 3 is articulated, and substantially comprises (FIGS. 2 and 3):

a drive shaft 10 which rotates anticlockwise about axis A in the top plan views in FIGS. 2 and 3;

a hub 11 fitted to shaft 10 to rotate integrally with shaft 10 about axis A; and a number of—in the example shown, five—blades 12 (FIG. 3) projecting from hub 11 on the opposite side to axis A, and elongated along respective axes B crosswise to axis A.

More specifically, hub 11 comprises a body 16 defining a cylindrical through seat 17 housing drive shaft 10; and a tubular portion 13, which is radially outwards of cylindrical body 16 with respect to axis A, has a curved polygonal profile, and is connected to body 16 by a number of angularly equally spaced spokes 14 radial with respect to axis A.

In other words, hub 11 has a number of through seats 15 open parallel to axis A, equally spaced about axis A, and through which to fasten respective blades 12.

More specifically, each seat 15 is bounded circumferentially by two adjacent spokes 14, is bounded by body 16 radially inwards with respect to axis A, and is bounded by tubular portion 13 radially outwards with respect to axis A.

Each blade 12 comprises a main body 18 (only shown partly in the drawings) defining the helicopter lift/thrust surfaces; and a coupling 19 bolted to the radially inner end 30 of body 18 with respect to axis A, and which connects blade 12 to hub 11.

Coupling 19 of each blade 12 is substantially C-shaped, and comprises two parallel arms 20, between which end 30 of body 18 of blade 12 is fixed; and a connecting portion 21 connecting arms 20 and which engages a respective seat 15 in hub 11.

Coupling 19 of each blade 12 is hinged to hub 11 with the interposition of an elastomeric bearing 25.

Each bearing 25 allows relative blade 12 to rotate about respective axis B to adjust its angle of attack with respect to the airstream; to rotate with respect to hub 11 and the other blades 12 about a respective axis C, parallel to and at a distance from axis A, to perform the so-called lead-lag movement; and to rotate about a respective axis D, perpendicular to axis A and crosswise to respective axis C, to perform the so-called flapping movement.

Axes B, C and D, about which each blade 12 rotates, all converge at one point.

Each blade 12 comprises an appendix 23 which is eccentric with respect to respective axis B, projects from a radially inner end of body 18 of blade 12 with respect to axis A, and is acted on by a control member to rotate blade 12 about respective axis B and so adjust the angle of attack with respect to the airstream.

Appendix 23 comprises two walls 26 having first ends 32 spaced apart parallel to axis A, and second ends 33, opposite ends 32, joined to each other. More specifically, ends 32 of walls 26 are fixed to end 30 of body 18 of relative blade 12.

Walls 26 are interposed between arms 20 of coupling 19.

On the side facing axis A, walls 26 of each appendix 23 are connected by a further wall.

Appendixes 23 project from relative bodies 18 on the same side of relative blades 12 with respect to relative axes B.

Rotor 3 advantageously comprises a number of dampers 40 for damping oscillation of relative blades 12 about respective axes C, and which comprise respective portions 41 movable integrally with relative blades 12 about respective axes C; and respective portions 42 connected functionally to one another and elastically to respective portions 41.

More specifically (FIGS. 2 and 3), each damper 40 is made of elastomeric material, and comprises a quantity of metal material embedded inside the elastomeric material, so each damper 40 is elastically deformable under load.

Each damper 40 is housed between walls 26 of appendix 23 of respective blade 12, and is substantially cylindrical about an axis E parallel to axis C of respective blade 12.

More specifically, each damper 40 comprises:
two bases 43 located at opposite ends along axis E, and which define portion 41 of damper 40 and are each fixed to a respective wall 26 of appendix 23; and
a lateral surface 44 interposed axially between bases 43 with respect to axis E.

More specifically, each portion 42 in turn comprises a first and second area 46a, 46b defined by respective separate areas of surface 44 of damper 40.

Each area 46b is interposed between axis A and axis D of relative damper 40, and each area 46a is located to the side of axis B of relative blade 12.

Axis B of each blade 12 extends through relative area 46b, but not through relative area 46a.

More specifically, the lines joining the barycentres of areas 46a, 46b of each damper 40 to relative axis E and drawn radially to axis E form an angle ranging between ninety and a hundred and thirty-five degrees.

Rotor 3 comprises a number of—in the example shown, five—rods 45 alternating with blades 12 and relative dampers 40.

More specifically, rods 45 alternate with blades 12 and relative dampers 40 about axis A.

Each rod 45 is preferably made of rigid material, and connects area 46a of one damper 40 to area 46b of the adjacent damper 40.

More specifically, each rod 45 comprises two axial ends 47, 48 housing respective pin joints 50, 49, which define respective seats engaged by respective threaded pins 55, 54 projecting respectively from area 46a of one damper 40 and area 46b of the adjacent damper 40.

End 48 of each rod 45 is interposed between axis A and axis D of relative damper 40, and end 47 is located to one side of axis B of relative blade 12.

Joints 50, 49 allow pins 55, 54 to adjust position in a plane perpendicular to axis A.

Figure 4:
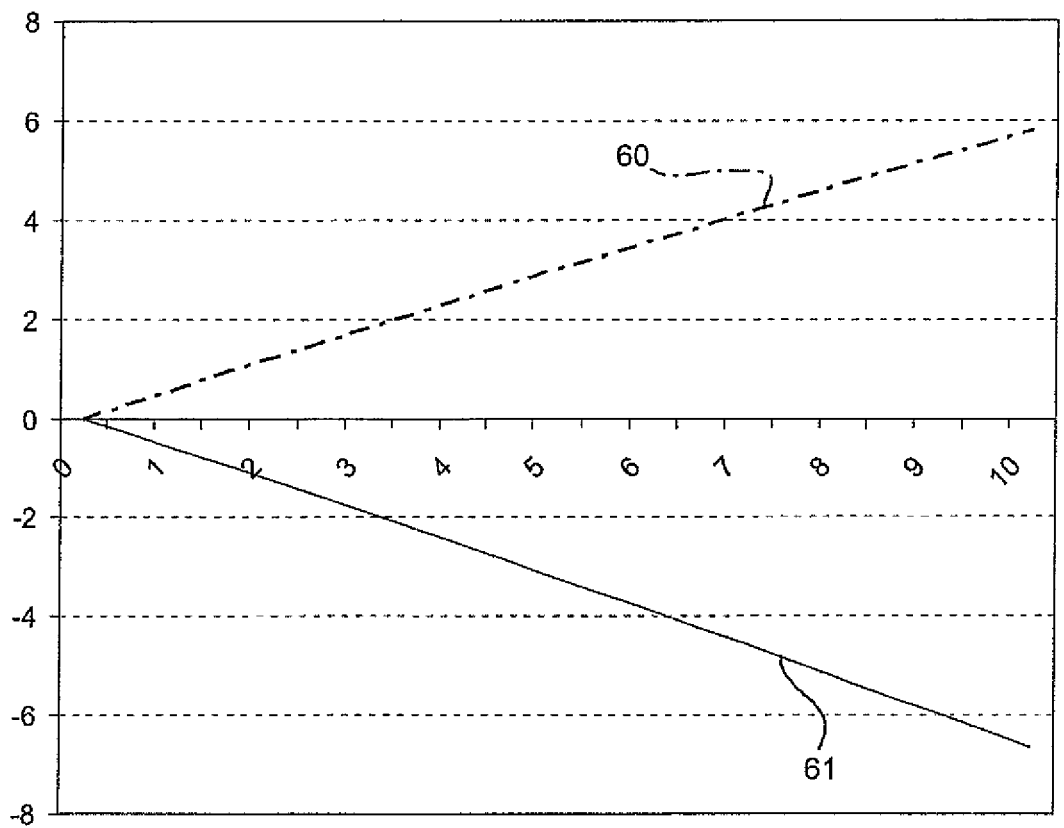
FIG. 4 shows a graph of angular displacement of a damper as a function of angular displacement of a blade in the first embodiment of the rotor in FIGS. 2 and 3, and relative to lead and lag movements of the blade.

The dot-and-dash line 60 in FIG. 4 indicates the angular displacement of a damper 40 about relative axis E as a function of angular displacement of relative blade 12 about relative axis C and in the opposite direction to rotation of hub 11 about axis A. In other words, dot-and-dash line 60 relates to lag movement of relative blade 12.

The continuous line 61 in FIG. 4 indicates the elastic angular displacement of a damper 40 about relative axis E as a function of rigid angular displacement of relative blade 12 about relative axis C and in the same direction as rotation of hub 11 about axis A. In other words, continuous line 61 relates to lead movement of relative blade 12.

FIG. 4 shows the effectiveness of each damper 40 in damping lead-lag oscillations of relative blade 12 of rotor 3 over the full range of rotation angles of blade 12 with respect to corresponding axis C.

FIG. 4 also shows clearly how elastic twisting of damper 40 increases proportionally alongside a variation in rotation of blade 12 about relative axis D.

In actual use, shaft 10 rotates hub 11 about axis A.

Rotation of hub 11 in turn rotates blades 12 as a whole about axis A.

Blades 12 are normally subjected to different aerodynamic loads having different components in a direction parallel to axis A, and which tilt blades 12 with respect to hub 11 about respective axes D, thus resulting in a flapping movement of blades 12.

The flapping movement of each blade 12 alters the distance between the barycentre of the blade and axis A.

To maintain its angular momentum with respect to axis A, each blade 12 rotates about respective axis C to increase its rotation speed with respect to axis A when its barycentre moves towards axis A. That is, each blade performs a lead movement.

Conversely, each blade 12 rotates about respective axis C to reduce its rotation speed with respect to axis A when its barycentre moves away from axis A. That is, each blade performs a lag movement.

Continual periodic oscillation of blades 12 about respective axes C produces vibration that is damped by dampers 40.

More specifically, at a given instant in time, as a result of the different speeds with respect to the airstream, blades 12 tilt at respective different angles with respect to hub 11 about respective axes D, so each blade 12 has a respective lead or lag angle about respective axis C and with respect to the other blades 12.

Operation of rotor 3 is described below with reference to one blade 12 and respective damper 40.

Portion 41 of damper 40 rotates integrally with blade 12 about axis C; area 46a of damper 40 moves integrally with area 46b of one of the two adjacent dampers 40, by means of relative rod 45; and area 46b of damper 40 moves integrally with area 46a of the other of the two adjacent dampers 40, by means of relative rod 45.

Areas 46a, 46b of portion 42 of damper 40 therefore move elastically towards or away from portion 41, thus producing elastic twisting of damper 40 about relative axis E, which, together with the internal damping of damper 40, damps vibration of blade 12 about axis C.

Figure 5:
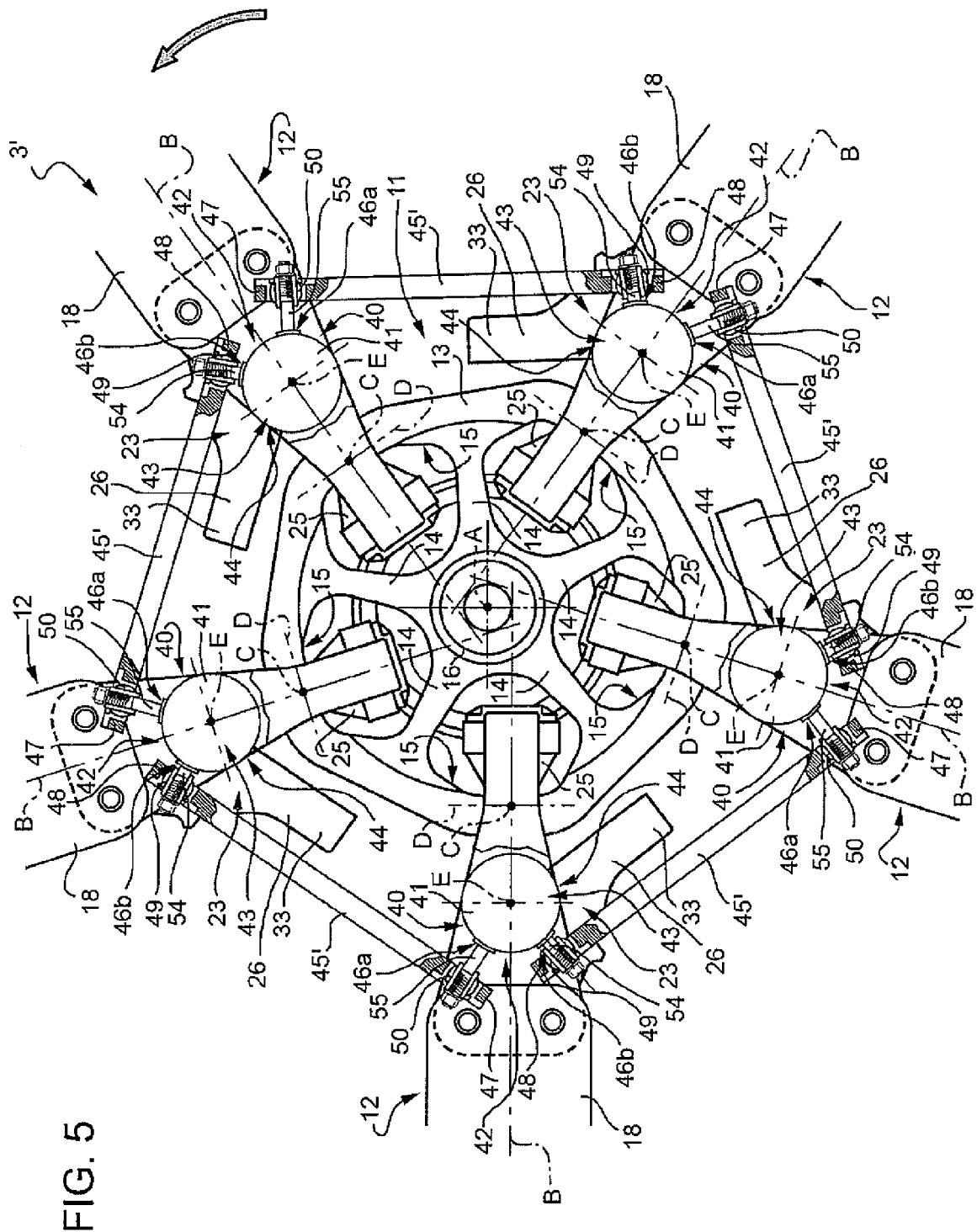
FIG. 5 shows a top plan view of a second embodiment of the rotor.

Number 3' in FIG. 5 indicates as a whole a helicopter rotor in accordance with a different embodiment of the present invention. Rotor 3' is similar to rotor 3 and therefore only described as regards the differences between the two, using the same reference numbers, where possible, for corresponding or equivalent parts of rotors 3, 3'.

Rotor 3' differs from rotor 3 by areas 46a, 46b of each damper 40 being defined by one half of surface 44 facing away from axis A.

In other words, areas 46a, 46b of each damper 40 are located on the opposite side of relative axis D to axis A.

Rods 45' differ from rods 45 by extending entirely on the opposite side of axes E of relative dampers 40 with respect to axis A.

Figure 6:
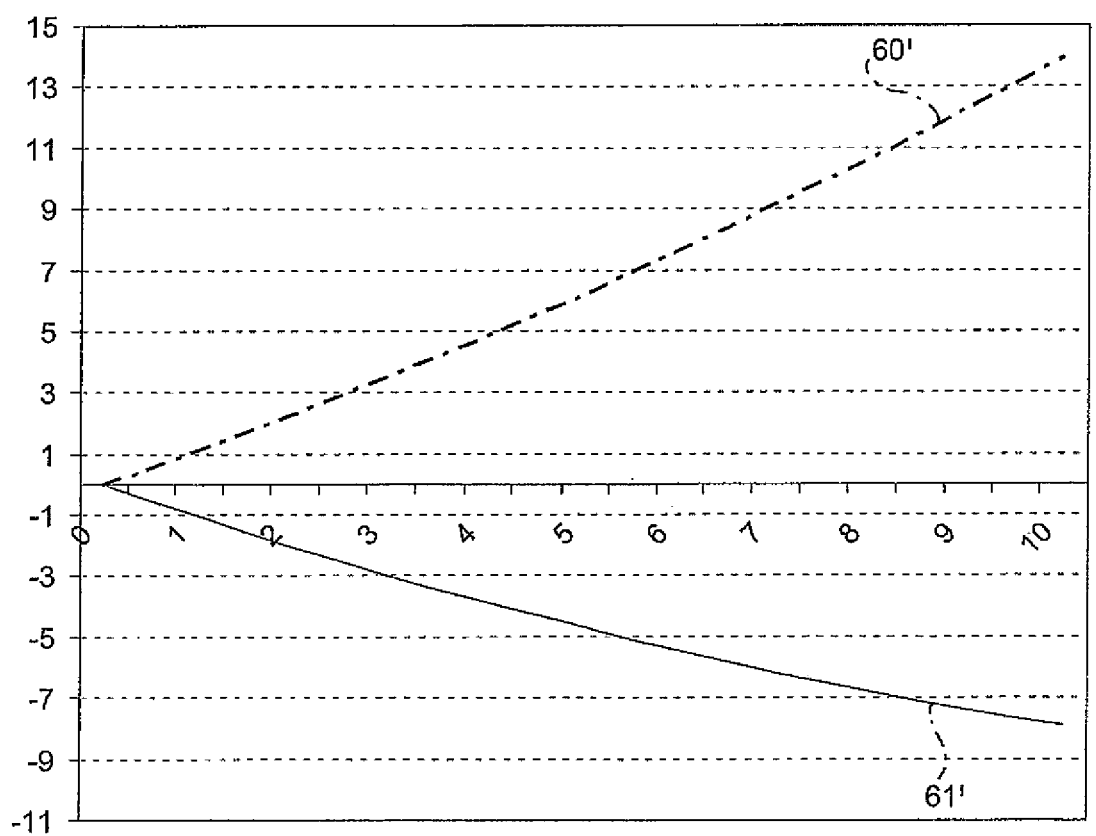
FIG. 6 shows a graph of angular displacement of a damper as a function of angular displacement of a blade in the second embodiment of the rotor in FIG. 5, and relative to lead and lag movements of the blade.

The dot-and-dash line 60' in FIG. 6 indicates elastic angular displacement of a damper 40 of rotor 3' about relative axis E as a function of angular displacement of relative blade 12 about relative axis C and in the opposite direction to rotation of hub 11 about axis A. In other words, dot-and-dash line 60' relates to lag movement of blade 12.

The continuous line 61' in FIG. 6 indicates elastic angular displacement of a damper 40 of rotor 3' about relative axis E as a function of rigid angular displacement of relative blade 12 about relative axis C and in the same direction as rotation of hub 11 about axis A. In other words, continuous line 61' relates to lead movement of blade 12.

FIG. 6 shows the effectiveness of each damper 40 in damping lead-lag oscillations of relative blade 12 of rotor 3' over the full range of rotation angles of blade 12 with respect to corresponding axis C.

FIG. 6 also shows clearly how elastic twisting of damper 40 increases proportionally alongside a variation in rotation of blade 12 about relative axis D.

Operation of rotor 3' is the same as that of rotor 3, and therefore not described in detail.

The advantages of rotor 3, 3' according to the present invention will be clear from the above description.

In particular, lead-lag oscillation of blades 12 is damped by relative dampers 40 twisting elastically about relative axes E, which means, unlike dampers with pistons moving radially to axis A, damping performance of dampers 40 is unaffected by centrifugal force and therefore effective over a wide range of rotation speeds of shaft 10 about axis A.

Moreover, unlike oil-operated dampers, for example, rotor 3, 3' provides for damping oscillation induced by lead-lag movement of blades 12 about relative axes C with no hydraulic components required.

As such, rotor 3, 3' not only greatly reduces vibration associated with lead-lag movement of blades 12, but is also extremely easy to construct and/or maintain.

Finally, given the light weight and compactness of dampers 40, the overall weight of rotor 3, 3' is greatly reduced with no impairment in the effectiveness of dampers 40.

Clearly, changes may be made to rotor 3, 3' as described and illustrated herein without, however, departing from the protective scope as defined in the accompanying Claims.

In particular, rotor 3, 3' may be employed as a tail rotor of helicopter 1.

The invention claimed is:

1. A rotor for a helicopter, comprising:
   a drive shaft rotating about a first axis;
   a hub angularly integral with said drive shaft about said first axis;
   at least two blades projecting from said hub on opposite sides of said first axis and elongated along respective second axes crosswise to said first axis, each said blade being movable with respect to said hub and to the other said blade about a respective third axis crosswise to the respective said second axis;
   a number of dampers for damping oscillation of respective said blades about the respective said third axes, and which comprise respective first portions movable integrally with the respective said blades about the respective said third axes;
   said dampers comprising respective second portions connected elastically to the respective first portions and functionally to each other;
   said second portions of said dampers being connected rigidly to one another; and
   a number of rigid rods interposed each between respective pair of said second portions of a respective pair of adjacent said dampers and alternating with said blades about said first axis:
   each said damper comprising two second portions and being connected to two adjacent dampers;
   one second portion of each damper being connected by one relative rod to a respective second portion of one of said adjacent dampers; the other second portion of each damper being connected by the other relative rod to a respective second portion of the other of said adjacent dampers.

2. A rotor as claimed in claim 1, characterized in that each said damper is made at least partly of elastically deformable material, is in the form of a tubular body with respect to a fourth axis, and comprises:
   two bases comprising said first portion and fixed to opposite walls of the respective said blade spaced apart along said fourth axis; and
   a lateral surface comprising said second portion and surrounding said fourth axis.

3. A rotor as claimed in claim 2, characterized in that each said blade comprises an appendix eccentric with respect to the relative said second axis; said appendix comprising said walls, and being acted on by an external member to rotate the respective said blade about the respective said second axis.

4. A rotor as claimed in claim 2, characterized in that said first and said fourth axis are parallel.

5. A rotor as claimed in claim 1, characterized by comprising a number of said blades and said dampers; and a number of said rods alternating with said blades about said first axis;
   each said damper comprising two second portions and being connected to two adjacent dampers;
   each second portion of each damper being connected by a relative rod to a respective second portion of one of said adjacent dampers.

6. A rotor as claimed in claim 5, characterized in that said second portions of each said damper are located on the opposite side of the relative said fourth axis with respect to said first axis.

7. A rotor as claimed in claim 5, characterized in that said rods extend on the opposite side of said fourth axes with respect to said first axis.

8. A rotor as claimed in claim 5, characterized in that at least one of said second portions is interposed between said first axis and said fourth axis of the relative said damper.

9. A rotor as claimed in claim 8, characterized in that the other of said second portions of each said damper is located to the side of the second axis of the relative blade.

10. A rotor as claimed in claim 9, characterized in that each said rod connects said one of said second portions of the relative damper to said other of said second portions of the adjacent said damper.

* * * * *